Figure 1:
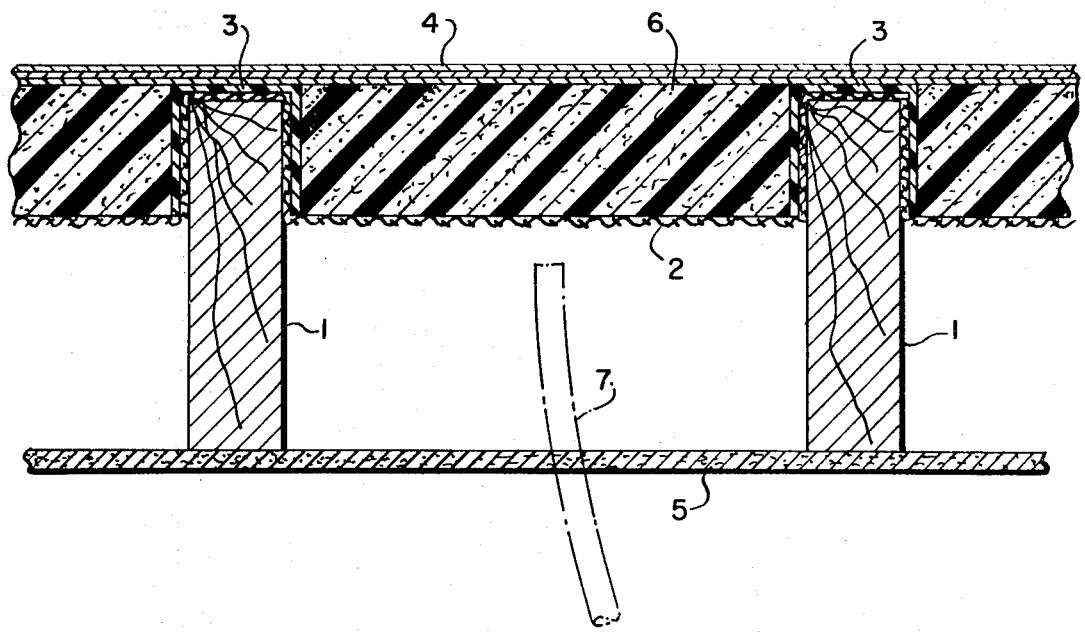
Figure 2:
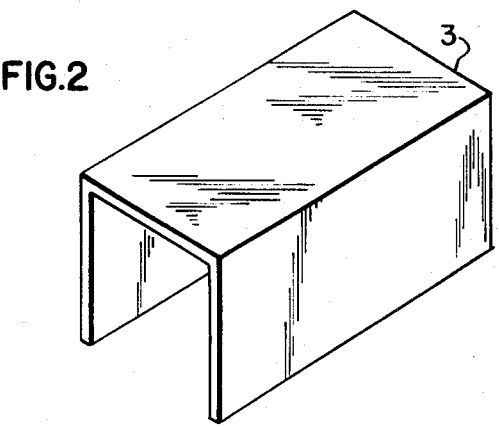

United States Patent

[11] 3,619,437

| [72] | Inventor | James R. McDonald, Jr.<br>Sacramento, Calif. |
|---|---|---|
| [21] | Appl. No. | 802,022 |
| [22] | Filed | Feb. 25, 1969 |
| [45] | Patented | Nov. 9, 1971 |
| [73] | Assignee | U.F. Chemical Corporation<br>Woodside, N.Y. |

[54] METHOD OF CHARGING A CAVITY WITH UREA-FORMALDEHYDE FOAM INSULATING MATERIAL
7 Claims, 2 Drawing Figs.

[52] U.S. Cl............................................ 264/45,
52/309, 52/407, 52/743, 260/2.5 F, 264/50,
264/257, 264/309
[51] Int. Cl......................................................... B29d 27/04
[50] Field of Search............................................ 264/51, 53,
50, 54, 45, 309; 260/2.5 F

[56] References Cited
UNITED STATES PATENTS

| 2,753,277 | 7/1956 | Smithers........................ | 260/2.5 F X |
| 2,780,090 | 2/1957 | Rasmussen..................... | 264/54 X |
| 2,860,856 | 11/1958 | Bauer............................. | 260/2.5 F UX |
| 3,082,486 | 3/1963 | Khawan.......................... | 264/45 X |
| 3,150,108 | 9/1964 | Vieli............................... | 260/2.5 F |

*Primary Examiner*—Donald J. Arnold
*Assistant Examiner*—Paul A. Leipold
*Attorney*—Kelman and Berman

ABSTRACT: The cavities in a ceiling between the joists are charged with thermal and acoustical insulation by loosely placing burlap over the joists prior to the installation of the subflooring so that the sagging burlap, the joists, and the subflooring define cavities. Catalyzed urea-formaldehyde foam is sprayed from below against the burlap and penetrates into the cavities where it is solidified into a porous mass having excellent insulating properties.

PATENTED NOV 9 1971 3,619,437

INVENTOR.
JAMES R. MAC DONALD, JR.
BY Kelman and Berman,

AGENTS

METHOD OF CHARGING A CAVITY WITH UREA-FORMALDEHYDE FOAM INSULATING MATERIAL

This invention relates to thermal and acoustical insulation and particularly to a method of charging cavities with insulating material.

It is common practice to fill space in buildings with porous solid material. The air trapped in the solid material is an efficient thermal insulator, and the porous material impedes the transmission of sound. The insulating material may be used in the form of shaped structural elements which are esthetically acceptable, but relatively expensive and not as effective as loose or bulk material confined out of sight in cavities of the structure. The use of bulk material requires a cavity to be built initially with an opening through which the insulating material may be introduced, and the opening to be closed thereafter which is usually inconvenient.

It has also been proposed to inject a foam containing a solidifiable material into a cavity and to cause the foam to harden in the cavity by admixing a hardening agent thereto. This method, as practiced heretofore, also requires an opening to be made for access to the cavity, and to be closed after the foaming operation. The porous mass formed by hardening of the foam does not tend to settle in a manner usual with loose bulk material which thereby loses much of its efficiency after a few years.

It is an object of the invention to install thermal and acoustical insulation consisting of a solidified foam in a manner which does not require an access opening to a cavity first to be made and to be closed after injection of the insulating material in the form of a hardenable foam.

With this object and others in view, as will become apparent hereinafter, the method of the invention provides that one side of a cavity to be charged with insulating material be left open during construction work, and that the open side be covered with a foraminous sheet. A substantially fluid foam is projected against an outer face of the sheet in the direction of its perforations and at a velocity sufficient to cause the foam to pass through the sheet into the cavity. The foam may be of any known type which contains an amount of solidifiable material sufficient to convert the foam into a substantially solid, porous mass upon solidification of the material. The material is thereafter solidified in the cavity.

Other features, additional objects, and many of the attendant advantages of this invention will readily be appreciated as the same becomes better understood by reference to the following detailed description referring to the attached drawing.

The sole Figure of the drawing shows elements of an otherwise conventional building in elevational section.

Onlay as much of the building is illustrated as is needed for an understanding of the invention. Joists 1, of which only two are seen in the drawing, extend horizontally from wall to wall of the building in spacedly parallel relationship and are set on edge, as is conventional. The top edges of the joists carry a sheet 2 of coarse burlap which is attached to the joists by clips 3 of resilient plastic, such as polyethylene or rigid polyvinyl chloride. The length of the burlap sheet 2 between the joists 1 is such that the clips 3 drape the sheet over approximately 2 inches of the vertical joist face, the remainder of the sheet the joists being thereby tensioned so as to extend practically horizontally from joist to joist about 2 inches below the level of the top edges of the joists.

A sheet of plywood 4 is superimposed on the top edges of the joists 1, the burlap 2, and the clips 3 to provide subflooring for the next higher floor, and thereby upwardly bounds a cavity which is bounded in opposite lateral horizontal directions by the joists 1, and downwardly by the free horizontal stretches of burlap 2. A panel 5 of sheet rock is nailed to the bottom edges of the joists 1 to form a flat ceiling for the lower floor. The cavity between the plywood sheet 4, the joists 1, and the burlap sheet 2 is filled with a solid, porous slab 6 of urea-formaldehyde resin.

The floor and ceiling partly illustrated in the drawing was constructed in the following manner The joists 1 were installed on the building walls in the usual manner, not shown in the drawing. The foraminous burlap sheet 2 was thereafter loosely placed over the joists 1 and fastened by means of the resilient clips 3, the center-to-center spacing of the joists being smaller than the spacing of the burlap portions which were fastened to the top edges of the joists. When initially placed over the joists 1, the burlap sheet 2 sagged between the joists, but at least a major portion of the excess length of burlap was absorbed by the clips 3 which held parts of the pliable burlap sheet 2 to the sides of the joists. When the flat, rigid, and imperforate plywood sheet 4 was thereafter superposed on the top edges of the joists and on the clips 3, the depth of the cavity between the plywood sheet 4 and the horizontal stretch of burlap 2 between the joists was practically uniform.

At this stage, and prior to the installation of the sheet rock ceiling 5, a foam of urea-formaldehyde precondensate was sprayed from below against the exposed outer face of the burlap 2. The foam was prepared in apparatus described in Bauer Pat. No. 2,860,856, and projected toward the burlap sheet 2 from a nozzle 7 shown in phantom view in the drawing. As the foam passed through the perforations in the burlap, it was broken up into a multiplicity of individual streams, but the still liquid streams again coalesced within the cavity, and the foam was solidified into a unitary slab of extremely porous material.

The velocity at which the foam was projected against the burlap sheet 2 was controlled empirically by setting the air pressure of the foam-making machine until dripping of liquid from the burlap sheet 2 was reduced to a minimum. Under properly adjusted conditions, the entire material projected from the nozzle 7 passed through the burlap sheet 2, and was retained in the cavity by the burlap.

A foaming composition which has been found to operate very successfully in the aforedescribed apparatus was mixed in the nozzle 7 from a 32 percent aqueous solution of 1:2 urea-formaldehyde precondensate, the ratio being in moles and from an aqueous solution of 9 percent Nacconol SZA, a surfactant which is a sodium alkylarylsulfonate and 1 percent phosphoric acid by weight, the acid acting as a polymerization catalyst for the prepolymer. The two solutions were mixed in the nozzle at a rate of 10 parts resin precursor solution to 9 parts acidified surfactant solution.

Compressed air at initially 65 p.s.i. was employed as a propellant which formed the gaseous phase of the foam discharged from the nozzle, but the air pressure was adjusted as needed, as described above. The porous urea-formaldehyde resin slab formed in the cavity between the joists 1, the burlap sheet 2, and the plywood subflooring 4 had a bulk density of 40 gram per liter.

Urea-formaldehyde foam is preferred over other foamed synthetic materials at this time because of its extremely low cost, its light weight and corresponding good insulating properties, its good fire resistance, and its parasite repellent properties believed due to a small amount of free formaldehyde which is tenaciously held by the solidified resin over extended periods. However, the method of this invention is not limited to specific materials nor to the manner in which they are converted to a foam and solidified after passage through the foraminous barrier provided by the burlap sheet 2 in the illustrative embodiment described above.

Loosely woven burlap combines desirable low cost and adequate mechanical properties in a manner to make it attractive for the purpose of this invention, but numerous other materials have been used successfully on an experimental basis. Woven wire screen is as effective as textile fabric in retaining the porous mass which quickly forms by solidification of the resin prepolymer in the foam. With minor adjustments in the foam composition, the burlap may be replaced by other foraminous sheets whose uniformly distributed perforations have a combined cross section of 10 to 90 of the total area of one face of the sheet.

With an adequate amount of catalyst, as exemplified above, the foam becomes so viscous immediately after passing the foraminous sheet 2 that it can no longer flow back in downward direction, and solidification thereafter is completed within a couple of minutes although the porous mass may not reach its highest mechanical strength until after a few hours, or overnight, while the water present in the original foam evaporates.

In order to permit rapid drying of the insulating material, it is preferred to delay installation of the sheet rock ceiling 6, but this is not absolutely necessary. The small amount of water initially used as a carrier for the resin precursor can diffuse through the panel 5.

The cost of installing thermal and acoustical insulation by the method of the invention is minimal, yet the results achieved are equal to the best heretofore available at much higher cost. The method of the invention is readily performed by unskilled labor.

What is claimed is:

1. A method of charging a cavity having a downwardly open side with insulating material which comprises:
   a. covering said open side with a foraminous sheet;
   b. projecting a substantially fluid urea-formaldehyde foam against an outer face of said sheet in a direction and at a velocity sufficient to cause said foam to pass through said sheet into said cavity,
      1. said foam containing an amount of solidifiable material sufficient to convert said foam into a substantially solid, porous mass filling said cavity upon solidification of said material; and
   c. solidifying said material in said cavity.

2. A method as set forth in cliam 1, wherein said foam has a gaseous phase and a liquid phase, the liquid phase essentially consisting of water, a urea-formaldehyde prepolymer dispersed in said water, and an acid in an amount sufficient to catalyze the hardening of said prepolymer in the presence of said water after passage of the foam through said sheet.

3. A method as set forth in claim 2, wherein said sheet is formed with a multiplicity of substantially uniformly distributed perforations extending from said outer face to said cavity, the combined cross section of said perforations being between 10 and 90 percent of the total area of said face.

4. A method as set forth in claim 2, wherein said cavity is closed in opposite horizontal directions by two spacedly juxtaposed joists, and upwardly by a substantially planar floor structure.

5. A method as set forth in claim 2, wherein said sheet is a fabric, said foam being projected upwardly against said outer face.

6. A method as set forth in claim 2, wherein said foraminous sheet is pliable, and said cavity is prepared by horizontally juxtaposing two joists on edge in spaced relationship, securing respective portions of said sheet to the top edges of said joists, the spacing of said portions being greater than the spacing of said joists, whereby said sheet sags between said joists because of the excess length thereof, and superposing a substantially rigid and imperforate sheet on said top edges and on said portions of the pliable sheet.

7. A method as set forth in claim 6, wherein respective parts of said pliable sheet adjacent said top edge are held closely to the sides of said joists to absorb at least a major portion of said excess length and to make the depth of said cavity between said sheets substantially uniform.

* * * * *